(12) United States Patent
Gupta

(10) Patent No.: US 11,455,069 B2
(45) Date of Patent: *Sep. 27, 2022

(54) AUTO-COMPLETE WITH PERSISTED ATOMICALLY LINKED ENTITIES

(71) Applicant: Microsoft Technology Licensing, LLC, Redmond, WA (US)

(72) Inventor: Kieran K. Gupta, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/827,896

(22) Filed: Nov. 30, 2017

(65) Prior Publication Data
US 2018/0150160 A1 May 31, 2018

Related U.S. Application Data

(63) Continuation of application No. 13/722,200, filed on Dec. 20, 2012, now Pat. No. 9,836,179.

(51) Int. Cl.
*G06F 3/048* (2013.01)
*G06F 40/274* (2020.01)

(52) U.S. Cl.
CPC ............ *G06F 3/048* (2013.01); *G06F 40/274* (2020.01)

(58) Field of Classification Search
CPC ......... G06F 3/048; G06F 3/0233–0237; G06F 40/166–186; G06F 40/134; G06F 40/10–197; G06F 40/274; G06F 3/0237
See application file for complete search history.

(56) References Cited

U.S. PATENT DOCUMENTS

| 6,629,793 B1 | 10/2003 | Miller |
| 7,346,660 B2 | 3/2008 | Kulkarni |

(Continued)

FOREIGN PATENT DOCUMENTS

| CN | 102474529 A | 5/2012 |
| CN | 102597996 A | 7/2012 |

(Continued)

OTHER PUBLICATIONS

Joj. "Highlighted Text Won't Delete When I Start Typing—Microsoft Office Word Forum—WordBanter." Microsoft Office Word Forum WordBanter RSS, Sep. 10, 2009, www.wordbanter.com/showthread.php?t=134104. (Year: 2009).*

(Continued)

*Primary Examiner* — Liang Y Li
(74) *Attorney, Agent, or Firm* — NovoTechIP International PLLC

(57) ABSTRACT

Persisting atomically linked entities when utilizing an auto-complete mechanism is provided. A computing device may be utilized to receive an input in a user interface. The computing device may then display an auto-complete suggestion list in response to receiving the input in the user interface. A selection of an entity may then be received from the auto-complete suggestion list. The selected entity may then be atomically linked to program code defining an action. The atomically linked entity may then be inserted in the user interface. The atomically linked entity may then be persisted among the input received within the user interface. The input is modifiable and the atomically linked entity is unmodifiable within the user interface.

18 Claims, 11 Drawing Sheets

(56) References Cited

U.S. PATENT DOCUMENTS

| | | | |
|---|---|---|---|
| 7,451,397 | B2 | 11/2008 | Weber et al. |
| 8,510,668 | B1* | 8/2013 | Raskin .................. G06F 3/0484 715/767 |
| 8,782,080 | B2* | 7/2014 | Lee ..................... G06F 16/2457 707/771 |
| 9,286,935 | B1* | 3/2016 | Wilder .................. G06F 3/0481 |
| 9,424,249 | B1* | 8/2016 | Grigsby ................ G06F 40/131 |
| 9,836,179 | B2 | 12/2017 | Gupta |
| 2004/0234315 | A1* | 11/2004 | Colwell ................ G06F 3/0233 400/489 |
| 2005/0251748 | A1* | 11/2005 | Gusmorino ........... G06F 3/0481 715/713 |
| 2006/0288297 | A1 | 12/2006 | Haitani et al. |
| 2009/0089690 | A1 | 4/2009 | Chi et al. |
| 2009/0210828 | A1* | 8/2009 | Kahn .................... G06F 40/169 715/205 |
| 2009/0271374 | A1 | 10/2009 | Korn et al. |
| 2010/0245261 | A1* | 9/2010 | Karlsson .............. G06F 3/0233 345/173 |
| 2010/0275109 | A1 | 10/2010 | Morrill |
| 2011/0004692 | A1 | 1/2011 | Occhino et al. |
| 2011/0202876 | A1 | 8/2011 | Badger et al. |
| 2011/0209040 | A1 | 8/2011 | Zeine et al. |
| 2011/0310026 | A1* | 12/2011 | Davis ................... G06F 3/0488 345/173 |
| 2012/0110493 | A1 | 5/2012 | Cabral |
| 2012/0197980 | A1* | 8/2012 | Terleski ............... G06Q 10/10 709/203 |
| 2012/0254823 | A1 | 10/2012 | Coren et al. |

FOREIGN PATENT DOCUMENTS

| | | |
|---|---|---|
| JP | S63121971 A | 5/1988 |
| JP | 2007193849 A | 8/2007 |
| JP | 2008250708 A | 10/2008 |
| JP | 2009190436 A | 8/2009 |
| JP | 2011138305 A | 7/2011 |
| JP | 2011141727 A | 7/2011 |
| JP | 2012532370 A | 12/2012 |
| JP | 2015522887 A | 8/2015 |
| WO | 2011002588 A1 | 1/2011 |

OTHER PUBLICATIONS

VogelSocialMedia. "How to Tag People in Facebook Status Updates". Apr. 25, 2010. Youtube. <https://www.youtube.com/watch?v=9ut_DPKcgBE> (Year: 2010).*

"Notice of Allowance Issued in Japanese Patent Application No. 2015-549715", dated Mar. 5, 2018, 6 Pages.

"Office Action Issued in Taiwan Patent Application No. 102143265", dated Feb. 20, 2017, 14 Pages.

"Office Action Issued in Taiwan Patent Application No. 102143265", dated Aug. 18, 2017, 5 Pages.

"Final Office Action Issued in U.S. Appl. No. 13/722,200", dated Jul. 6, 2015, 18 Pages.

"Final Office Action Issued in U.S. Appl. No. 13/722,200", dated May 6, 2016, 12 Pages.

"Non Final Office Action Issued in U.S. Appl. No. 13/722,200", dated Mar. 3, 2017, 12 Pages.

"Non Final Office Action Issued in U.S. Appl. No. 13/722,200", dated Jan. 4, 2016, 17 pages.

"Non Final Office Action Issued in U.S. Appl. No. 13/722,200", dated Feb. 18, 2015, 18 Pages.

"Notice of Allowance Issued in U.S. Appl. No. 13/722,200", dated Jul. 31, 2017, 12 Pages.

"Office Action Issued in Chinese Patent Application No. 201380066943.8", dated Dec. 16, 2016, 15 Pages.

Vogel, Eric, "How to Tag People in Facebook Status Updates", Retrieved From <<https://web.archive.org/web/20120604131005/http://www.youtube.com/watch?v=9ut_DPKcgBE&gl=US&hl=en>>, Apr. 26, 2010, 8 Pages.

"Second Office Action Issued in Chinese Patent Application No. 201380066943.8", dated Aug. 23, 2017, 12 Pages.

Yaldex, "Creating an Autosuggest Text Box", Retrieved From: <<http://googleweblight.com/i?u=http://www.yaldex.com/ajax-tutorial-4/BBL0050.html&hl=en-IN>>, Mar. 23, 2003, 17 pages.

"Implement Auto-Complete Textbox in WPF", Retrieved From: <<code.msdn.microsoft.com/windowsdesktop/VBWPFAutoCompleteTextBox-1e4e9f56>>, Mar. 12, 2014, 8 Pages.

"Textbox (XPFE Autocomplete)", Retrieved From <<https://developer.mozilla.org/en-US/docs/Mozilla/Tech/XUL/Textbox_(Toolkit_autocomplete)>>, Sep. 22, 2012, 16 Pages.

"International Search Report and Written Opinion Issued in PCT Application No. PCT/US2013/076562", dated Jul. 1, 2014, 10 Pages.

"Second Written Opinion Issued in PCT Application No. PCT/US2013/076562", dated Nov. 13, 2014, 6 Pages.

Smith, Damien, "How to Tag Facebook Status Updates/Posts and Status Comments", Retrieved From: <<https://www.youtube.com/watch?v=pwQufCG-Oj0>>, Mar. 12, 2011, 4 Pages.

Stallman, et al., "Getting Started with XEmacs", Retrieved From: <<https://web.cs.dal.ca/-johnston/links/Xemacs_newbie.pdf>>, Jul. 1, 1994, 64 Pages.

Targett, Cassandra, "Auto-Complete of User Queries", Retrieved From <<https://web.archive.org/web/20130307002326/https://lucidworks.lucidimagination.com/display/lweug/Auto-Complete+of+User+Queries#page-metadata-end>>, Apr. 27, 2012, 3 Pages.

"Office Action Issued in Chinese Patent Application No. 201380066943.8", dated Dec. 22, 2017, 16 Pages.

"Office Action Issued in Japanese Patent Application No. 2015-549715", dated Dec. 1, 2017, 6 Pages.

U.S. Appl. No. 13/722,200, Amendment and Response filed May 18, 2015, 15 pages.

U.S. Appl. No. 13/722,200, Amendment and Response filed Nov. 5, 2015, 11 pages.

U.S. Appl. No. 13/722,200, Amendment and Response filed Apr. 1, 2016, 12 pages.

U.S. Appl. No. 13/722,200, Amendment and Response filed Aug. 3, 2016, 12 pages.

U.S. Appl. No. 13/722,200, Amendment and Response filed Jun. 5, 2017, 13 pages.

"Office Action Issued in Argentina Patent Application No. 20130104919", dated Nov. 12, 2018, 3 Pages.

"1200 Instances of asp.net Development", Dec. 31, 2011, 4 Pages.

"Fourth Office Action Issued in Chinese Application No. 201380066943.8", dated Sep. 5, 2018, 19 Pages.

"Office Action Issued in Japanese Patent Application No. 2018-071526", dated Dec. 7, 2018, 8 Pages.

"Office Action Issued in Korean Patent Application No. 10-2015-7016328", dated Dec. 28, 2019, 5 Pages.

* cited by examiner

AUTO-COMPLETE WITH PERSISTED ATOMICALLY LINKED ENTITIES

CROSS-REFERENCE TO RELATED APPLICATIONS

This application is a continuation of U.S. patent application Ser. No. 13/722,200, now U.S. Pat. No. 9,836,179, filed on Dec. 20, 2012, titled "AUTO-COMPLETE WITH PERSISTED ATOMICALLY LINKED ENTITIES," which is incorporated herein by reference. To the extent appropriate, a claim for priority is made the above-identified application.

COPYRIGHT NOTICE

A portion of the disclosure of this patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many mobile and desktop computer software applications provide auto-complete mechanisms which suggest entities from a list as a user types, character-by-character. For example, many social networking applications utilize auto-complete mechanisms to facilitate the posting of messages to other users. In particular, each entity (i.e., a name) in a list of suggested entities has a special programmatic meaning such that when a selected entity (e.g., "John Smith") is posted, the social networking application will send a message directly to that user. The above-described auto-complete mechanisms however, suffer from a number of drawbacks. For example, because each entity suggested by an auto-complete mechanism is atomic (i.e., if the text of the entity is split up or modified in any way it would no longer have a valid meaning), any edits, such as the deletion of one or more characters, to an entity will result in the special programmatic meaning being broken and thus, nothing will happen when posting a message to the entity. Previous solutions to this problem include providing a visual indication that the entity is "special" (e.g., surrounding the entity in brackets, using background shading, displaying the entity in a different color, etc.) and then hoping the user will not make any changes or modifications which might break the special programmatic meaning. However, the aforementioned solution is aesthetic only and does not actually prevent a user from modifying the entity. Other solutions include disallowing a user from making any changes to the text of a message after starting to type or inserting the entity. However, the aforementioned solution also has the undesirable result of forcing the user to erase the entire message and start over from scratch when it becomes necessary to modify any text (including text not associated with the entity) in the message, thereby stripping the user of the ability to edit their message while typing. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for persisting atomically linked entities when utilizing an auto-complete mechanism. A computing device may be utilized to receive an input in a user interface. The computing device may then display an auto-complete suggestion list in response to receiving the input in the user interface. A selection of an entity may then be received from the auto-complete suggestion list. The selected entity may then be atomically linked to program code defining an action. The atomically linked entity may then be inserted in the user interface. The atomically linked entity may then be persisted among the input received within the user interface. The input is modifiable and the atomically linked entity is unmodifiable within the user interface.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for persisting atomically linked entities when utilizing an auto-complete mechanism.

A computing device may be utilized to receive an input in a user interface. The computing device may then display an auto-complete suggestion list in response to receiving the input in the user interface. A selection of an entity may then be received from the auto-complete suggestion list. The selected entity may then be atomically linked to program code defining an action. The atomically linked entity may then be inserted in the user interface. The atomically linked entity may then be persisted among the input received within the user interface. The input is modifiable and the atomically linked entity is unmodifiable within the user interface.

Figure 1:
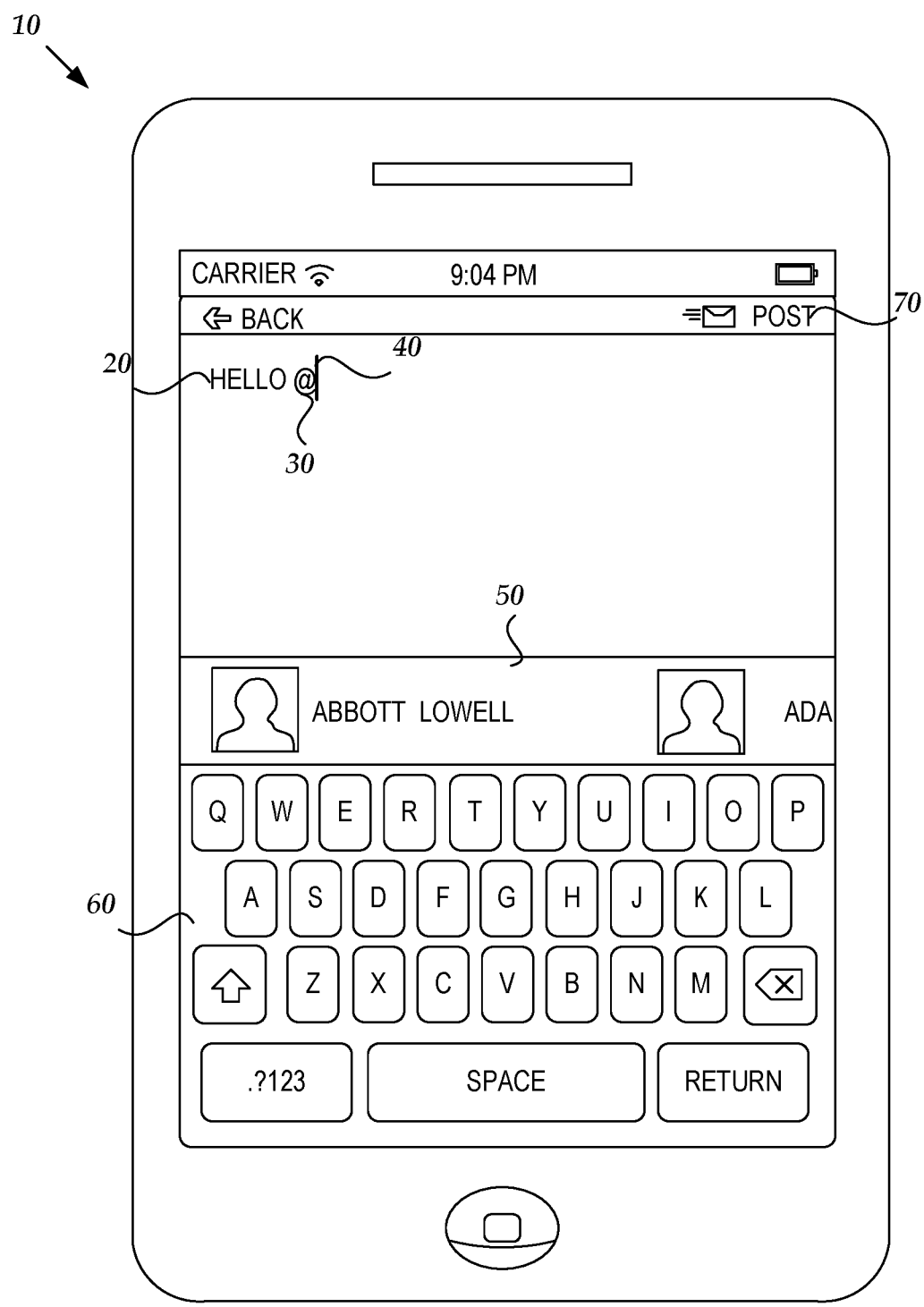
FIG. 1 is a computing device screen display of a user interface for persisting atomically linked entities when utilizing an auto-complete mechanism, in accordance with an embodiment.

FIG. 1 is a computing device screen display 10 of a user interface for persisting atomically linked entities when utilizing an auto-complete mechanism, in accordance with an embodiment. As will be discussed in greater detail herein, the computing device may comprise a general purpose desktop, laptop, handheld, tablet, or other type of computer capable of executing one or more application programs. The user interface may include an input area (e.g., a text box) for receiving an input 20 from a user via keyboard 60. The keyboard 60 may comprise a touchscreen or physical keyboard for entering text or graphic characters (e.g., emoticons, etc.) into the input area. It should be appreciated that in accordance with various embodiments, the input 20 may also be received via voice, gestures or other means known by those skilled in the art for inputting data. In accordance with an embodiment, the input area may be utilized for composing a message to one or more users for posting (via post command 70) to a social networking site. In accordance with an embodiment, the input area may further include invocation character 30 which, in accordance with an embodiment, may comprise a predetermined special character (e.g., a "@" symbol) which may be utilized to invoke an auto-complete suggestion list 50. It should be understood that, in accordance with various embodiments, the invocation character 30 may comprise any number of predetermined special characters for invoking the auto-complete suggestion list 50. It should further be understood that, in accordance with an alternative embodiment, a predetermined special character may not be required and the auto-complete suggestion list 50 may be invoked by typing one or more initial characters of an entity name (e.g., the first few letters of a user's social networking account name). A cursor 40 is also provided for allowing a user to enter additional input following the selection of an entity from the auto-complete suggestion list 50.

As will be described in greater detail herein, the auto-complete suggestion list 50 may be utilized to select an entity (e.g., a user's name or term) for insertion into the input area as a special or "atomic" entity. It should be understood that an atomic entity, as defined herein, is an entity that is linked to special code (e.g., program code) that has a specific meaning. Once an atomic entity has been inserted into the input area, the link is persisted even while a user continues to type a message. Once an entity is atomically linked, a user may only either use the entire term or delete the entire term. However, the user is prevented from modifying any portion of the atomic entity. In accordance with an embodiment, the auto-complete suggestion list 50 may be populated from a database of finite entities (e.g., user names) each of which is linked to data (e.g., account data) which may be utilized for accessing information about an entity directly from within a message. For example, the selection of an atomic entity linked to a user within a social networking post may cause the display of that user's social network profile information. As another example, an atomic entity may be linked to a tracking number which, when selected within a message, may direct a user to package tracking information. As should be appreciated by those skilled in the art, atomic entities may also be linked to other types of data. It should be understood that the message posts described herein may comprise "rich" posts which are text posts having content as part of the post. Examples of rich posts may include, without limitation, tags or hash tags which are linked to other content related to text contained within a post.

In accordance with an embodiment, the user interface on the computing device screen display 10 may be generated by an integrated web application platform for providing intranet portals, document and file management, collaboration, social networks, extranets, websites, enterprise search, and business intelligence. An illustrative integrated web application platform is the SHAREPOINT web application platform developed by MICROSOFT CORPORATION of Redmond, Wash. It should be understood, however, that other web application platforms from other manufacturers may also be utilized without departing from the spirit and scope of the embodiments described herein.

Figure 2:
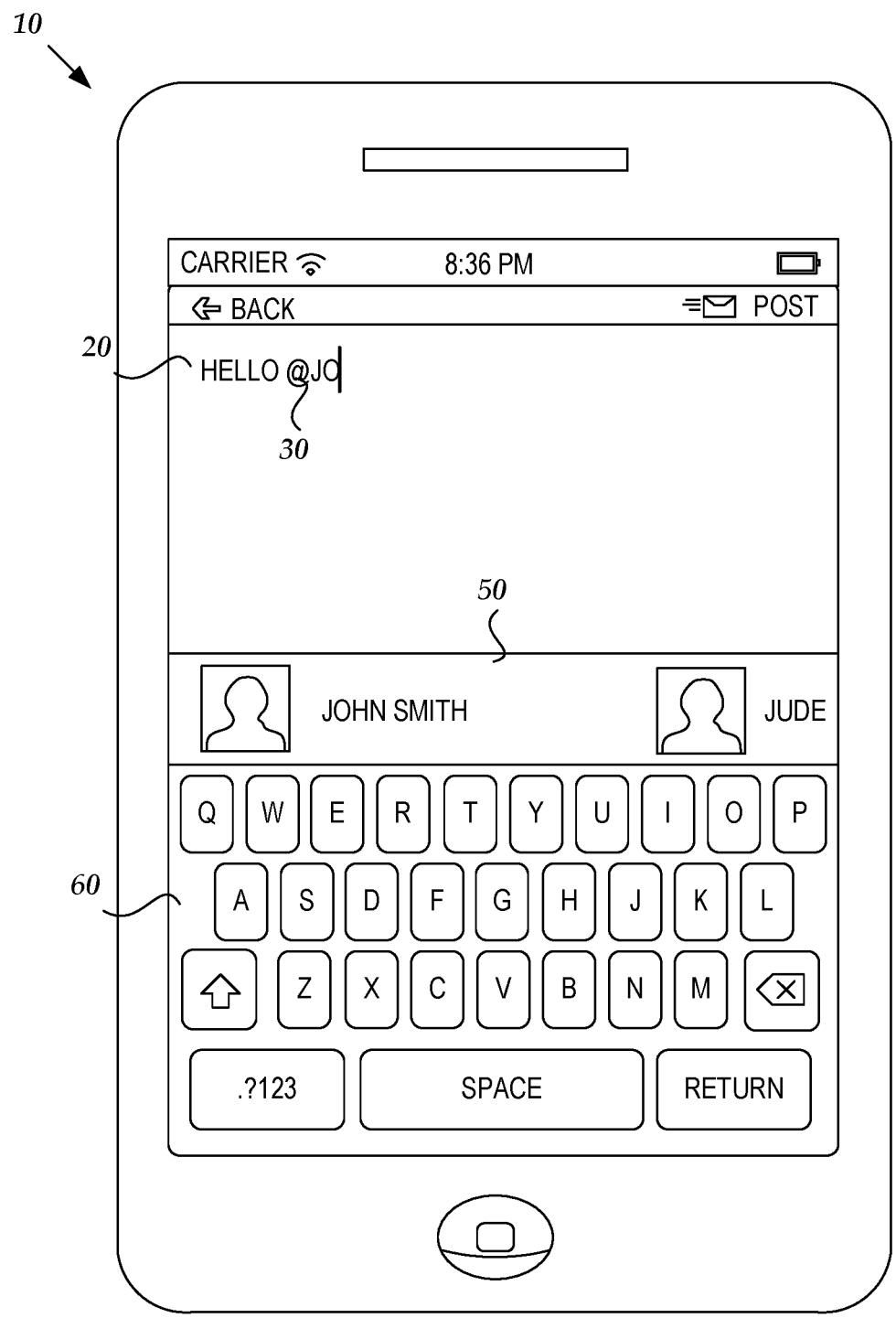
FIG. 2 is a computing device screen display of a user interface for persisting atomically linked entities when utilizing an auto-complete mechanism, in accordance with another embodiment.

FIG. 2 is a computing device screen display 10 of a user interface for persisting atomically linked entities when utilizing an auto-complete mechanism, in accordance with another embodiment. In the user interface of FIG. 2, the input area shows additional text input added to the input 20 (from the keyboard 60) following the invocation character 30. As the additional text is entered (i.e., character-by-character), the auto-complete suggestion list 50 automatically filters the entities based on matching characters in the additional text input. Thus, the alphabetical listing of entities is filtered from entities starting with the character "A" (as shown in FIG. 1) to entities starting with the character "Jo" (e.g., "John Smith").

Figure 3:
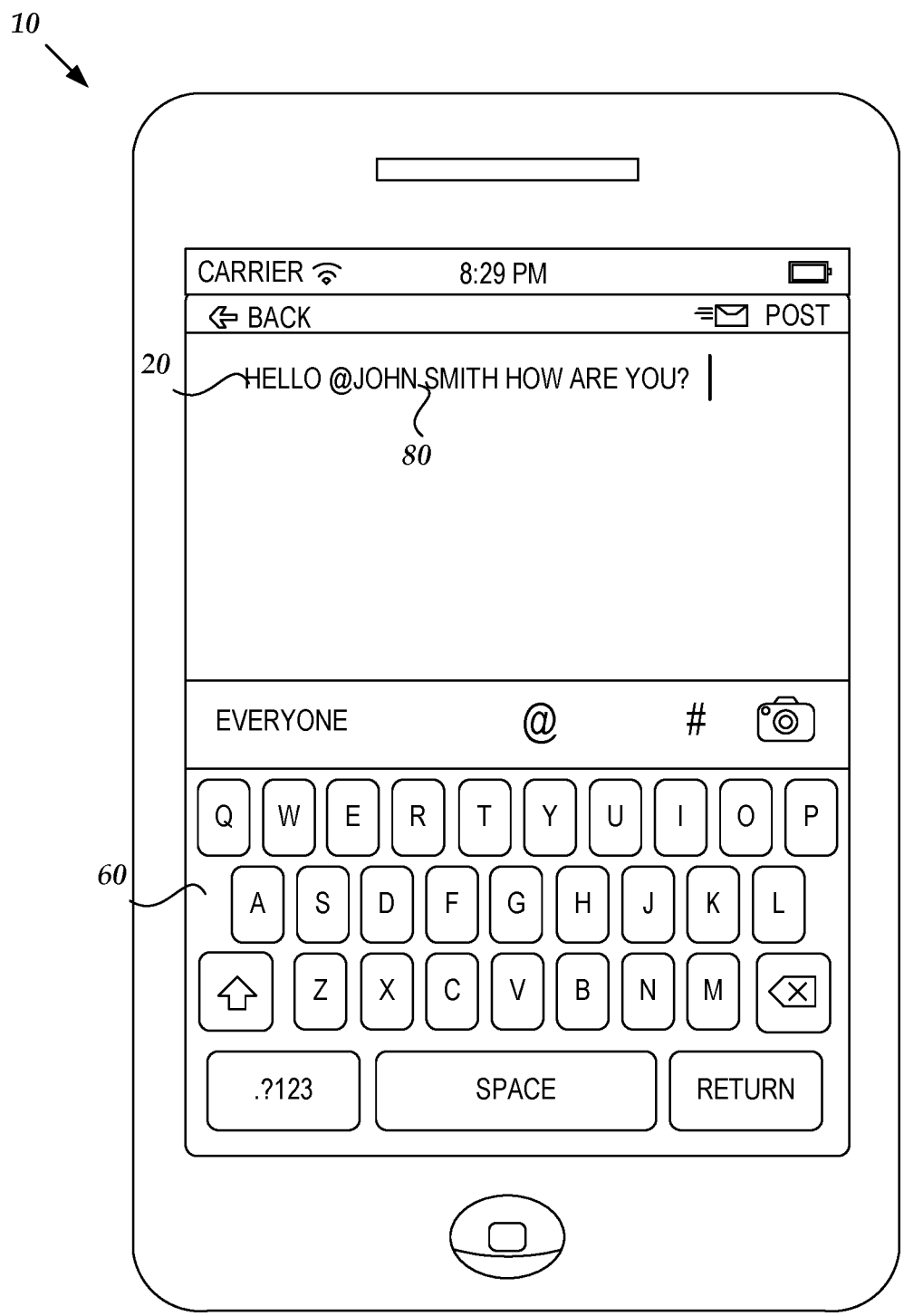
FIG. 3 is a computing device screen display of a user interface for persisting atomically linked entities when utilizing an auto-complete mechanism, in accordance with another embodiment.

FIG. 3 is a computing device screen display 10 of a user interface for persisting atomically linked entities when utilizing an auto-complete mechanism, in accordance with another embodiment. In the user interface of FIG. 3, the input area shows the insertion of an entity 80 (i.e., "John Smith") within the input 20 which was selected (e.g., via touch or input from the keyboard 50) from the auto-complete suggestion list shown in FIG. 2. It should be understood that the auto-complete suggestion list is no longer visible following the insertion of the entity 80 (alternatively referred to herein as the "atomic entity 80"). In particular, in accordance with an embodiment, the auto-complete suggestion list may be automatically hidden upon the insertion of an entity from the auto-complete suggestion list. It should be understood that there may be instances when an entity is not selected from the auto-complete suggestion list during while the input 20 is being entered into the user interface. In these instances, the auto-complete suggestion list may also be hidden in response to a user entered termination character (e.g., a period, question mark, exclamation point, etc.). It should further be understood that upon the insertion of the entity 80 among the input 20, the entity 80 is linked to special code and the length and starting position of the entity in the input 20 is maintained. As discussed above with respect to FIG. 1, upon insertion among the input 20, the entity 80 is atomically linked (i.e., the entity may only be used as a whole or deleted as a whole but may not be partially modified).

Figure 4:
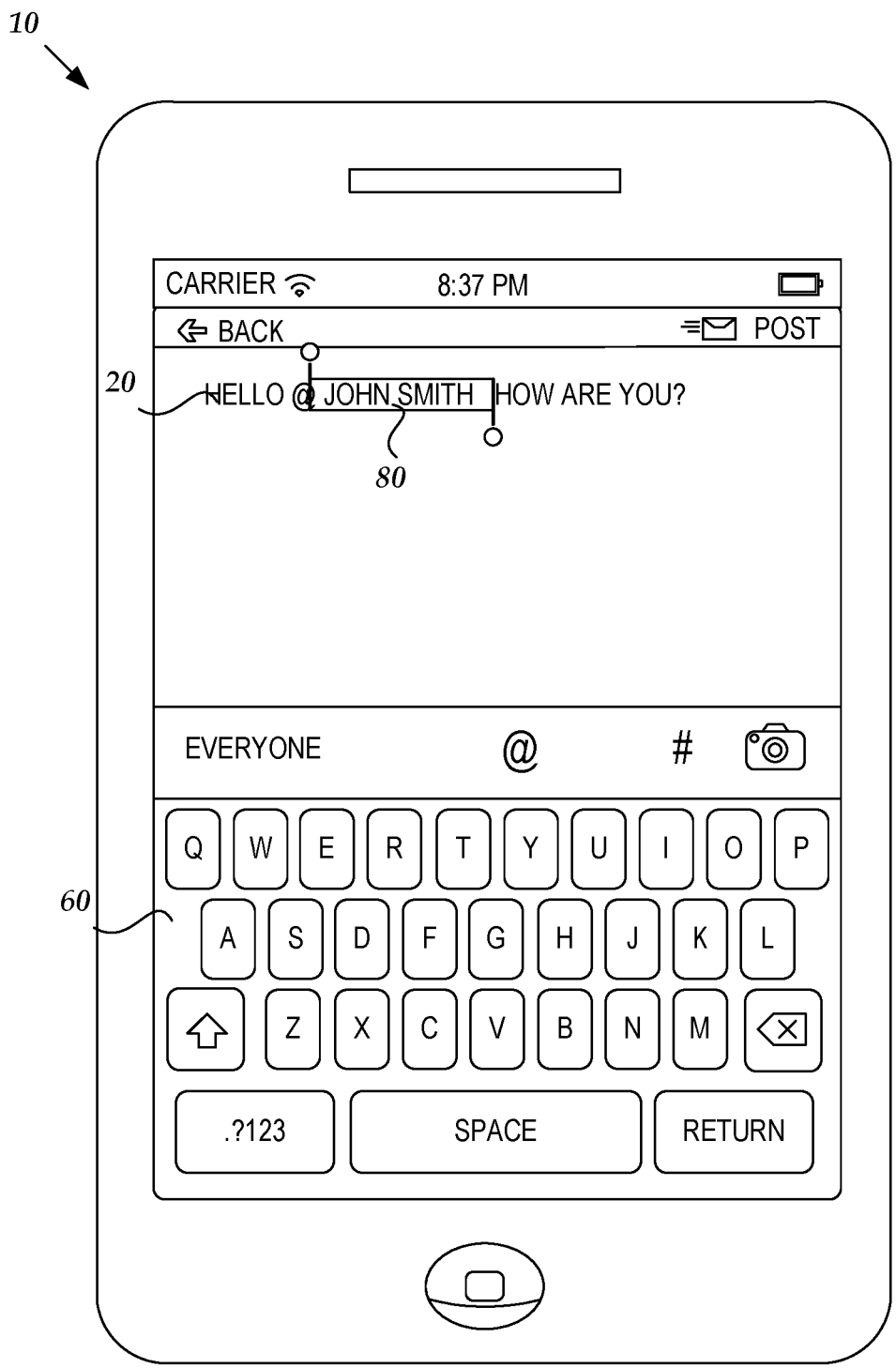
FIG. 4 is a computing device screen display of a user interface for persisting atomically linked entities when utilizing an auto-complete mechanism, in accordance with another embodiment.

FIG. 4 is a computing device screen display 10 of a user interface for persisting atomically linked entities when utilizing an auto-complete mechanism, in accordance with another embodiment. In the user interface of FIG. 4, the input area shows the selection of the atomic entity 80 (i.e., "John Smith") within the input 20. In accordance with an embodiment, the entire atomic entity 80 (e.g., via touch or input from the keyboard 60) may be highlighted or otherwise emphasized (e.g., bolded, underlined, etc.) in response to receiving a selection anywhere inside of the text of comprising the atomic entity 80. It should be understood that the highlighting of the entire atomic entity 80 may be utilized to visually convey that a user is prohibited from adding additional text or removing specific characters from the atomic entity 80.

Figure 5:
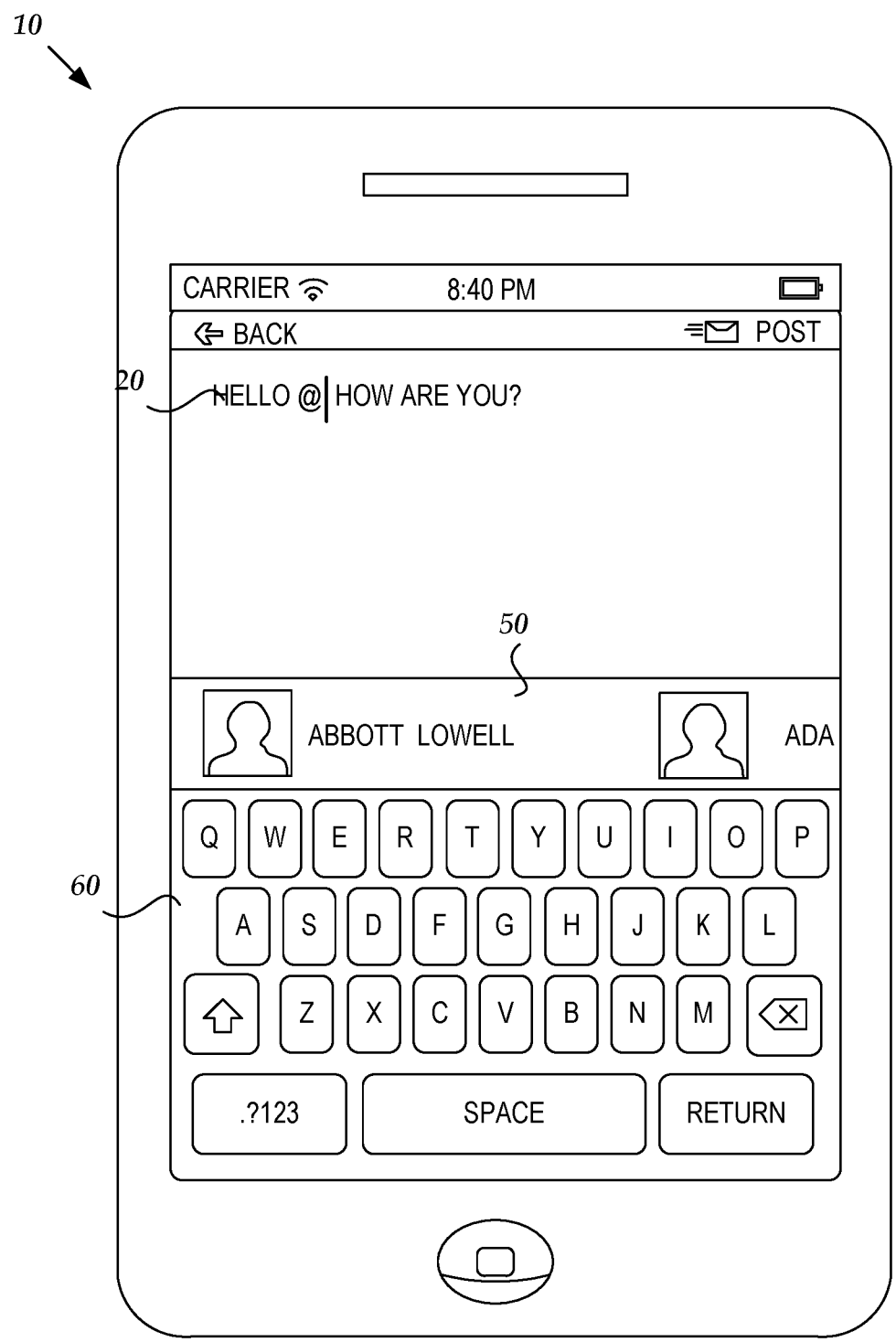
FIG. 5 is a computing device screen display of a user interface for persisting atomically linked entities when utilizing an auto-complete mechanism, in accordance with another embodiment.

FIG. 5 is a computing device screen display 10 of a user interface for persisting atomically linked entities when utilizing an auto-complete mechanism, in accordance with another embodiment. In the user interface of FIG. 5, the input area shows the deletion of the atomic entity 80 (show in FIG. 4) from the input 20 in response to a user editing action. In particular, the atomic entity 80 may be deleted when a user, via the keyboard 60, backspaces or attempts to enter a new character after the atomic entity 80 has been selected. Thus, it should be appreciated that the atomic entity 80 is enforced by prohibiting the modification of part of entity (which would in turn break any associated link). It should be understood that the once the atomic entity 80 has been deleted, the auto-complete suggestion list 80 is automatically invoked so that a user may select another entity for insertion into the input 20.

Figure 6:
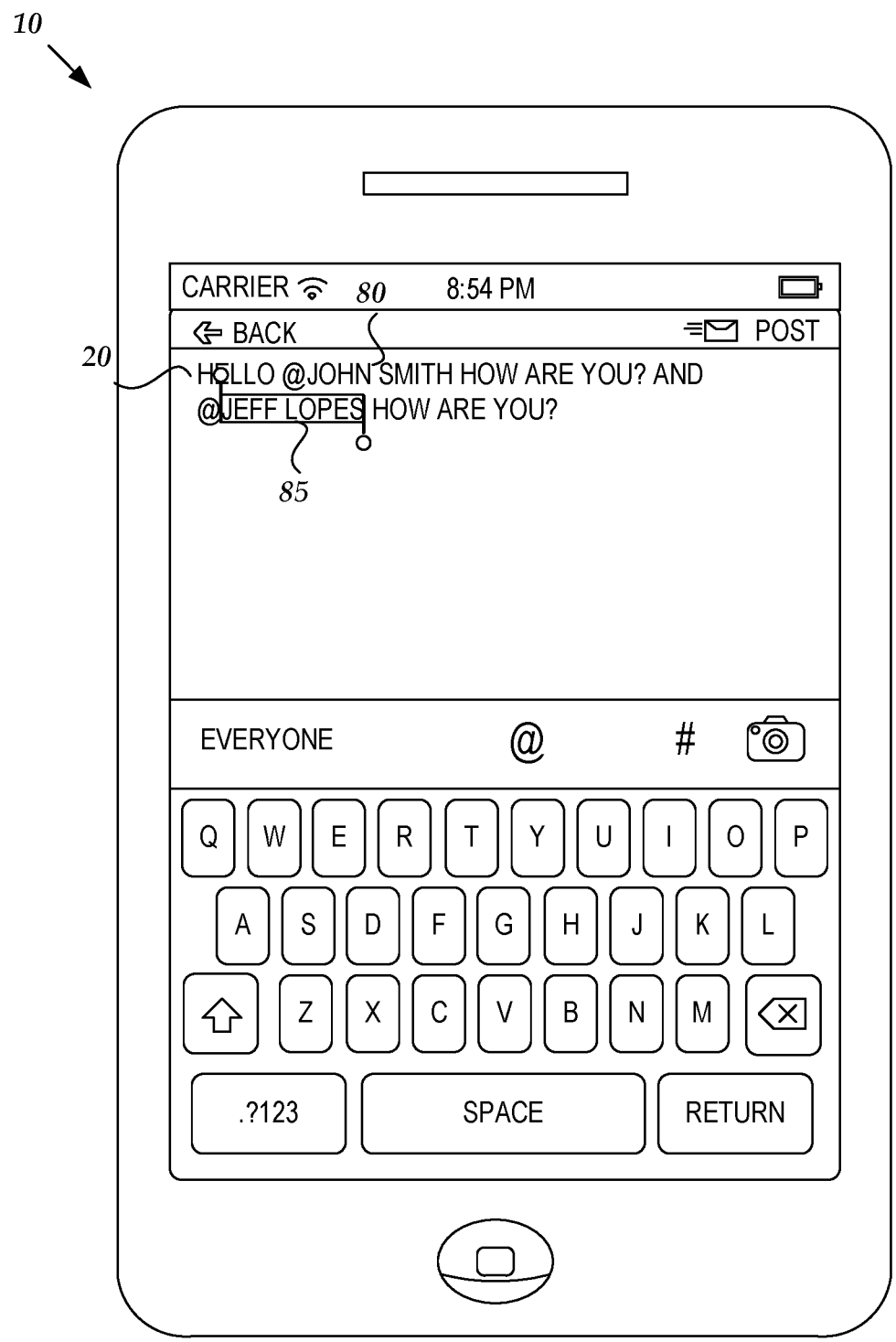
FIG. 6 is a computing device screen display of a user interface for persisting atomically linked entities when utilizing an auto-complete mechanism, in accordance with another embodiment.

FIG. 6 is a computing device screen display 10 of a user interface for persisting atomically linked entities when utilizing an auto-complete mechanism, in accordance with another embodiment. In the user interface of FIG. 6, the input area shows multiple atomic entities (i.e., the atomic entities 80 and 85) which have been inserted among the input 20 with the atomic entity 85 being shown as selected by a user (e.g., highlighted). In accordance with an embodiment, the links for multiple unique entities may be independently persisted to special (e.g., program) code appropriately and their atomic nature may be separately maintained so that a user is prohibited from modifying any of a number of displayed atomic entities.

Figure 7:
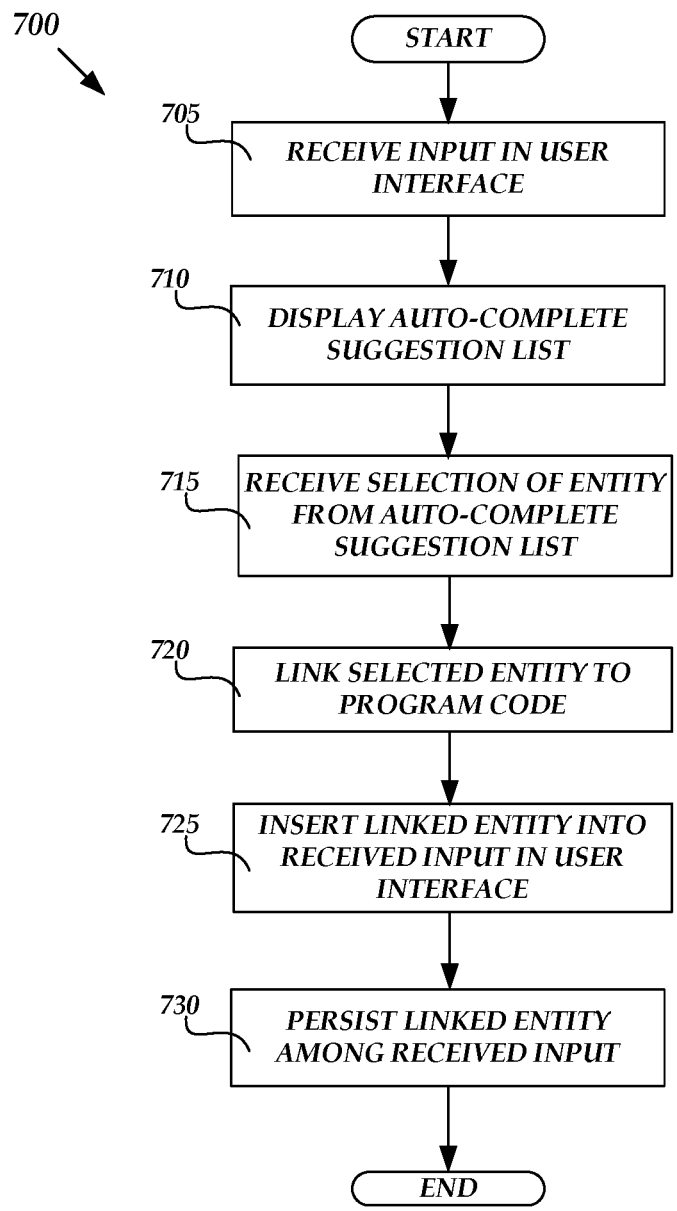
FIG. 7 is a flow diagram illustrating a routine for persisting atomically linked entities when utilizing an auto-complete mechanism, in accordance with an embodiment.

FIG. 7 is a flow diagram illustrating a routine illustrating a routine 700 for persisting atomically linked entities when utilizing an auto-complete mechanism, in accordance with an embodiment. When reading the discussion of the routine presented herein, it should be appreciated that the logical operations of various embodiments of the present invention are implemented (1) as a sequence of computer implemented acts or program modules running on a computing device or system, and/or (2) as interconnected machine logical circuits or circuit modules within the computing device or system. The implementation is a matter of choice dependent on the performance requirements of the computing device or system implementing the invention. Accordingly, the logical operations illustrated in FIGS. 7-8 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 700 begins at operation 705, where an application executing on a computing device receives an input in a user interface. For example, a messaging application may receive text or graphics (e.g., emoticons, etc.) for posting a message to another user on a social networking website.

From operation 705, the routine 700 continues to operation 710, where the application executing on the computing device may display an auto-complete suggestion list of selectable entities in response to receiving the input in the user interface. In accordance with an embodiment, the auto-complete suggestion list may be displayed automatically in response to receiving a predetermined character (e.g., a "@" symbol) among received text in the user interface. In accordance with alternative embodiment, the auto-complete suggestion list may be displayed automatically in response to the first few characters of an entity (e.g., a user name) being received in the user interface. It should be understood that after the auto-complete suggestion list has been displayed, the list may be dynamically filtered by the application as additional characters corresponding to known entities are input into the user interface.

From operation 710, the routine 700 continues to operation 715, where the application executing on the computing device may receive a selection of an entity from the auto-complete suggestion list.

From operation 715, the routine 700 continues to operation 720, where the application executing on the computing device may link the selected entity to program code defining an action. For example, the application may link the selected entity to program code for initiating a message post to a user identified by the selected entity.

From operation 720, the routine 700 continues to operation 725, where the application executing on the computing device may insert the linked entity in the user interface among the received input. As discussed above, it should be understood that the inserted linked entity is atomic. That is, the atomic entity may only be either used as a whole or deleted as a whole. Thus, a user is prevented from modifying any portion of the atomic entity.

From operation 725, the routine 700 continues to operation 730, where the application executing on the computing device may persist the linked entity among the input received within the user interface. As discussed above, any portion of the input outside of the atomic entity may be modified, however, the atomic entity itself is unmodifiable within the user interface. From operation 730, the routine 700 then ends.

It should be understood that, in accordance with an embodiment, the operations 700-730 (discussed above) may also be applied to multiple atomic entities. In particular, after a first entity has been selected from the auto-complete suggestion list, one or more different entities may also be selected in response to subsequent input being received in the user interface. The one or more different entities may further be linked to program code defining an action (e.g., for initiating a message post) and inserted as atomic entities in a user interface. Finally, each of the different atomic entities may be independently persisted such that each of the atomic entities is unmodifiable while any surrounding input (e.g., text) may be modified by a user.

Figure 8:
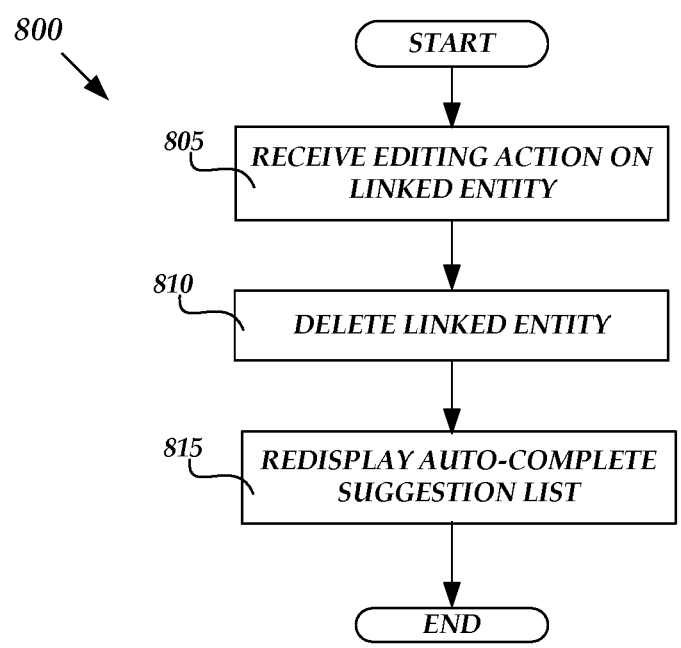
FIG. 8 is a flow diagram illustrating a routine for persisting atomically linked entities when utilizing an auto-complete mechanism, in accordance with another embodiment.

FIG. 8 is a flow diagram illustrating a routine illustrating a routine 800 for persisting atomically linked entities when utilizing an auto-complete mechanism, in accordance with another embodiment. The routine 800 begins at operation 805, where an application executing on a computing device receives an editing action on a linked entity. The editing action may comprise a backspace or an attempt to enter a new character within an atomic entity. In accordance with an embodiment, the application may be configured to dynamically compute a character position upon receiving an editing action to determine whether or not the editing action is directed towards an atomic entity. The application may further be configured to highlight an atomic entity upon detecting the movement of a cursor over the entity.

From operation 805, the routine 800 continues to operation 810, where the application executing on the computing device may delete the linked entity in response to receiving the editing action. In particular, and as discussed above with respect to FIG. 5, the application may enforce an atomic entity by prohibiting the modification of part of entity (which would in turn break any associated link).

From operation 810, the routine 800 continues to operation 815, where the application executing on the computing device may redisplay the auto-complete suggestion list in response to the deletion of the atomic entity at operation 810. From operation 815, the routine 800 then ends.

Figure 9:
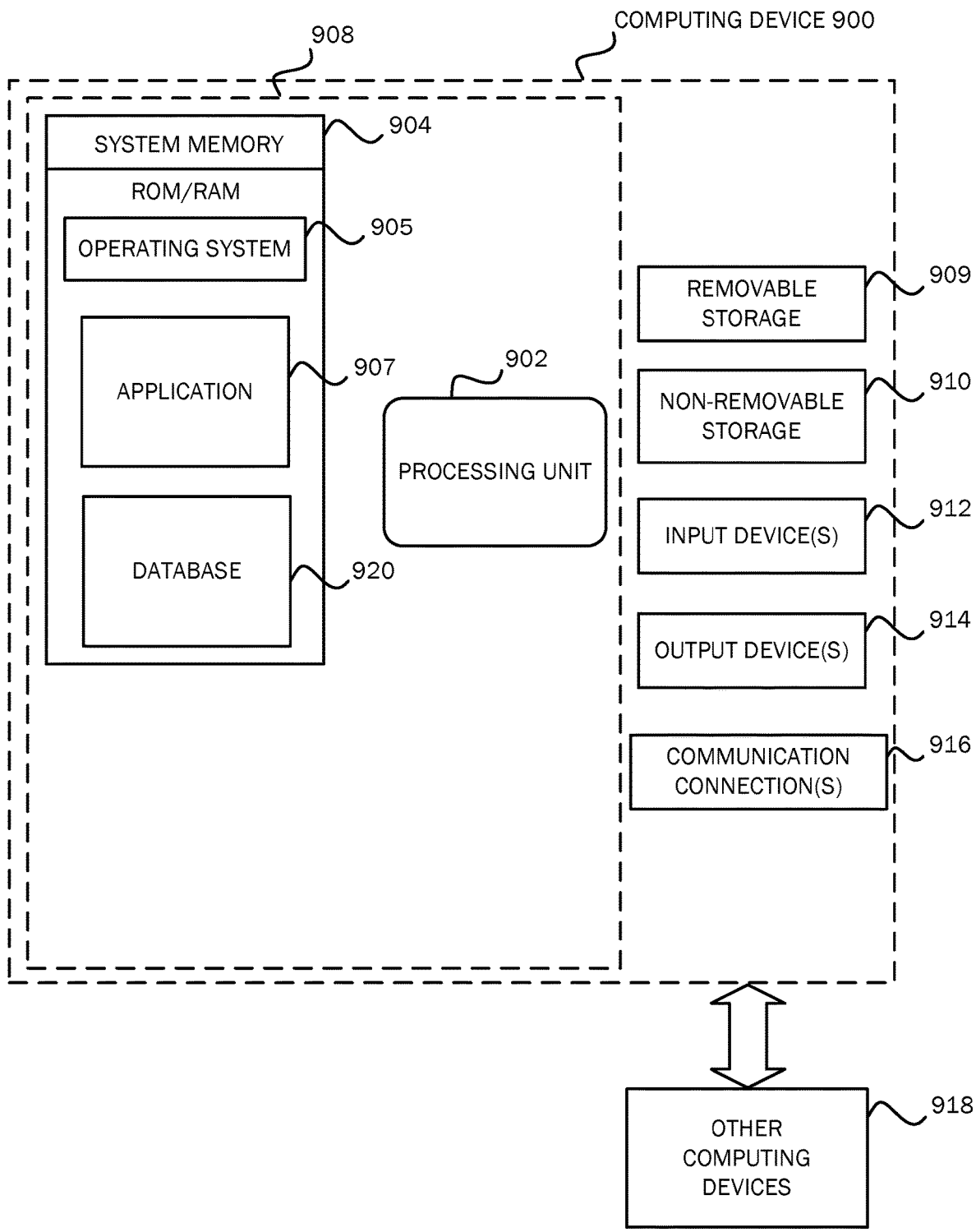
FIG. 9 is a simplified block diagram of a computing device with which various embodiments may be practiced.

FIG. 9 is a block diagram illustrating example physical components of a computing device 900 with which various embodiments may be practiced. In a basic configuration, the computing device 900 may include at least one processing unit 902 and a system memory 904. Depending on the configuration and type of computing device, system memory 904 may comprise, but is not limited to, volatile (e.g. random access memory (RAM)), non-volatile (e.g. read-only memory (ROM)), flash memory, or any combination. System memory 904 may include an operating system 905, application 907 and database 920. Operating system 905, for example, may be suitable for controlling computing device 900's operation and, in accordance with an embodiment, may comprise the iOS and OS operating systems from APPLE INC. of Cupertino, Calif., the WINDOWS operating systems from MICROSOFT CORPORATION of Redmond, Wash. or the ANDROID operating system from GOOGLE INC. of Mountain View, Calif. It should be understood that the embodiments described herein may also be practiced in conjunction with other operating systems and application programs and further, is not limited to any particular application or system. The application 907 may be utilized for persisting atomically linked entities when utilizing an auto-complete mechanism. In accordance with an embodiment, the application 907 may comprise an integrated web application platform for providing intranet portals, document and file management, collaboration, social networks, extranets, websites, enterprise search, and business intelligence. An illustrative integrated web application platform is the SHAREPOINT web application platform developed by MICROSOFT CORPORATION of Redmond, Wash. It should be understood, however, that other web application platforms from other manufacturers may also be utilized without departing from the spirit and scope of the embodiments described herein. The database 920 may be utilized to store finite entities (e.g., user names) each of which is linked to data (e.g., account data) which may be utilized for accessing information about an entity directly from within a message.

The computing device 900 may have additional features or functionality. For example, the computing device 900 may also include additional data storage devices (removable and/or non-removable) such as, for example, magnetic disks, optical disks, solid state storage devices ("SSD"), flash memory or tape. Such additional storage is illustrated in FIG. 9 by a removable storage 909 and a non-removable storage 910.

Generally, consistent with various embodiments, program modules may be provided which include routines, programs, components, data structures, and other types of structures that may perform particular tasks or that may implement particular abstract data types. Moreover, various embodiments may be practiced with other computer system configurations, including hand-held devices, multiprocessor systems, microprocessor-based or programmable consumer electronics, minicomputers, mainframe computers, and the like. Various embodiments may also be practiced in distributed computing environments where tasks are performed by remote processing devices that are linked through a communications network. In a distributed computing environment, program modules may be located in both local and remote memory storage devices.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 900 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Various embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 904, removable storage 909, and non-removable storage 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 900. Any such computer storage media may be part of the computing device 900.

The computing device 900 may also have input device(s) 912 such as a keyboard, a mouse, a pen, a sound input device (e.g., a microphone) for receiving a voice input, a touch input device for receiving gestures, etc. Output device(s) 914 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
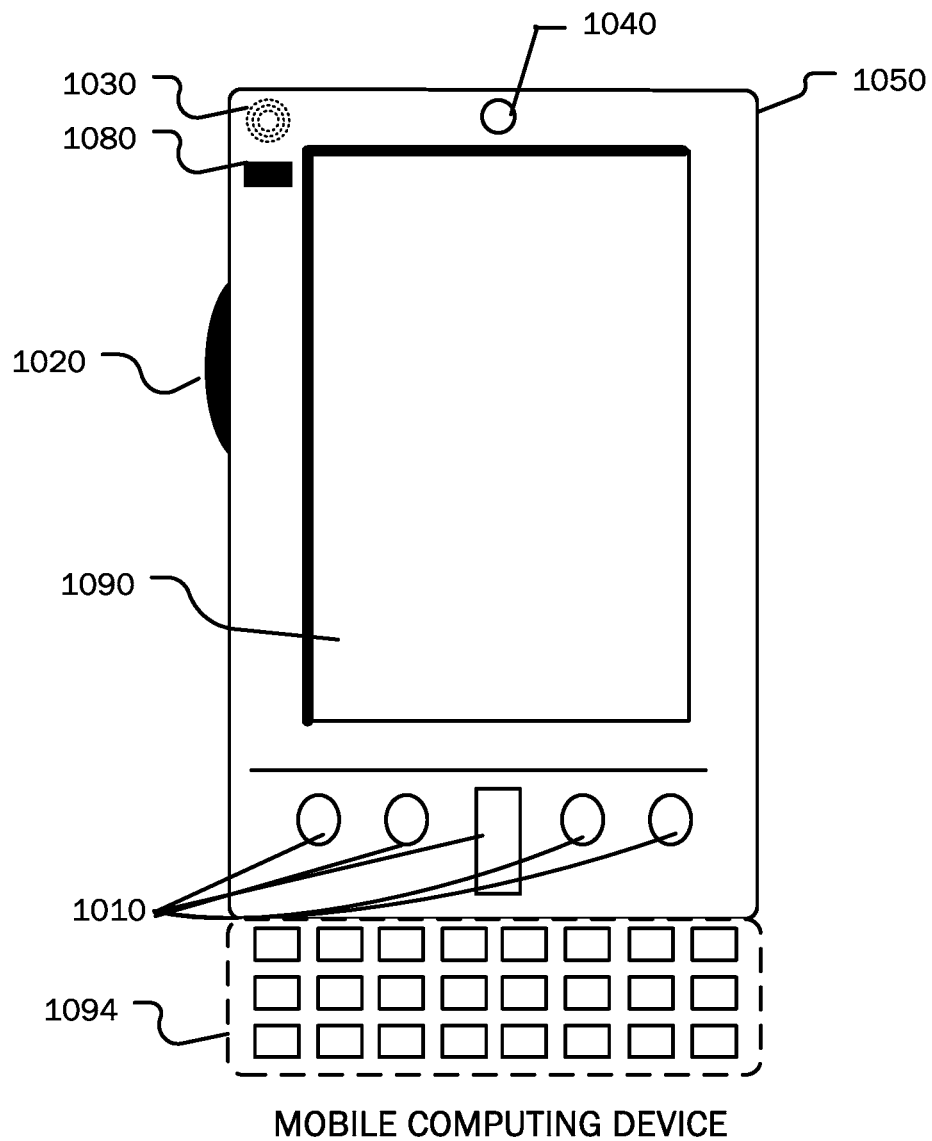
FIG. 10A is a simplified block diagram of a mobile computing device with which various embodiments may be practiced.
Figure 10B:
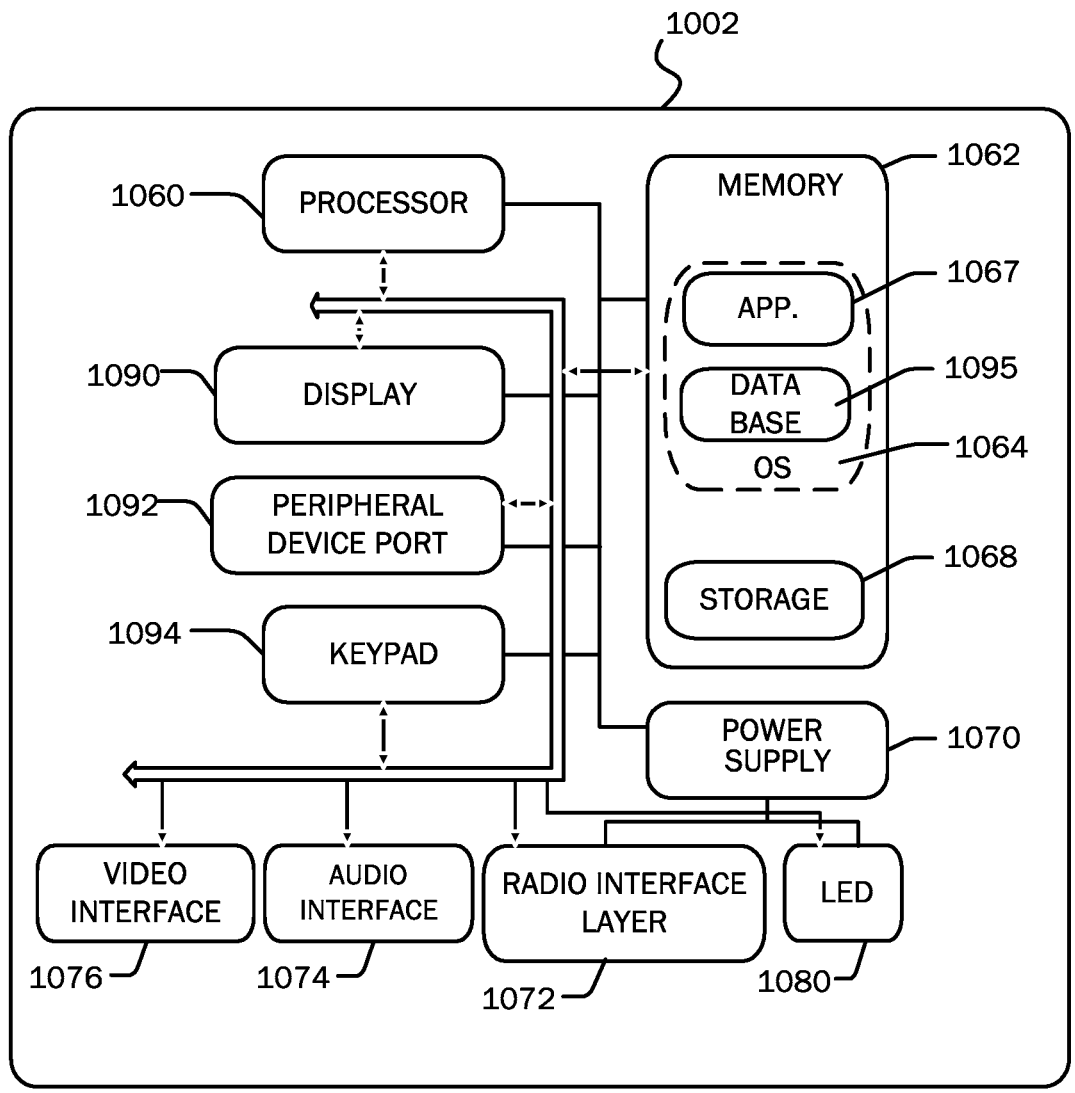
FIG. 10B is a simplified block diagram of a mobile computing device with which various embodiments may be practiced.

FIGS. 10A and 10B illustrate a suitable mobile computing environment, for example, a mobile computing device 1050 which may include, without limitation, a smartphone, a tablet personal computer, a laptop computer, and the like, with which various embodiments may be practiced. With reference to FIG. 10A, an example mobile computing device 1050 for implementing the embodiments is illustrated. In a basic configuration, mobile computing device 1050 is a handheld computer having both input elements and output elements. Input elements may include touch screen display 1025 and input buttons 1010 that allow the user to enter information into mobile computing device 1050. Mobile computing device 1050 may also incorporate an optional side input element 1020 allowing further user input. Optional side input element 1020 may be a rotary switch, a button, or any other type of manual input element. In alternative embodiments, mobile computing device 1050 may incorporate more or less input elements. For example, display 1025 may not be a touch screen in some embodiments. In yet another alternative embodiment, the mobile computing device is a portable telephone system, such as a cellular phone having display 1025 and input buttons 1010. Mobile computing device 1050 may also include an optional keypad 1005. Optional keypad 1005 may be a physical keypad or a "soft" keypad generated on the touch screen display.

Mobile computing device 1050 incorporates output elements, such as display 1025, which can display a graphical user interface (GUI). Other output elements include speaker 1030 and LED 1080. Additionally, mobile computing device 1050 may incorporate a vibration module (not shown), which causes mobile computing device 1050 to vibrate to notify the user of an event. In yet another embodiment, mobile computing device 1050 may incorporate a headphone jack (not shown) for providing another means of providing output signals.

Although described herein in combination with mobile computing device 1050, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 10B is a block diagram illustrating components of a mobile computing device used in one embodiment, such as the mobile computing device 1050 shown in FIG. 10A. That is, mobile computing device 1050 can incorporate a system 1002 to implement some embodiments. For example, system 1002 can be used in implementing a "smart phone" that can run one or more applications similar to those of a desktop or notebook computer. In some embodiments, the system 1002 is integrated as a computing device, such as an integrated personal digital assistant (PDA) and wireless phone.

One or more applications 1067 and a database 1095 may be loaded into memory 1062 and run on or in association with an operating system 1064. The system 1002 also includes non-volatile storage 1068 within memory the 1062. Non-volatile storage 1068 may be used to store persistent information that should not be lost if system 1002 is powered down. The one or more applications 1067 may be utilized for persisting atomically linked entities when utilizing an auto-complete mechanism. The one or more applications 1067 may use and store information in the database 1095 and in the non-volatile storage 1068. In accordance with an embodiment, the one or more applications 1067 may comprise an integrated web application platform for providing intranet portals, document and file management, collaboration, social networks, extranets, websites, enterprise search, and business intelligence. An illustrative integrated web application platform is the SHAREPOINT web application platform developed by MICROSOFT CORPORATION of Redmond, Wash. It should be understood, however, that other web application platforms from other manufacturers may also be utilized without departing from the spirit and scope of the embodiments described herein. The database 1095 may be utilized to store finite entities (e.g., user names) each of which is linked to data (e.g., account data) which may be utilized for accessing information about an entity directly from within a message.

A synchronization application (not shown) also resides on system 1002 and is programmed to interact with a corresponding synchronization application resident on a host computer to keep the information stored in the non-volatile storage 1068 synchronized with corresponding information stored at the host computer. As should be appreciated, other applications may also be loaded into the memory 1062 and run on the mobile computing device 1050.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio 1072 (i.e., radio interface layer) that performs the function of transmitting and receiving radio frequency communications. The radio 1072 facilitates wireless connectivity between the system 1002 and the "outside world," via a communications carrier or service provider. Transmissions to and from the radio 1072 are conducted under control of OS 1064. In other words, communications received by the radio 1072 may be disseminated to the applications 1067 via OS 1064, and vice versa.

The radio 1072 allows the system 1002 to communicate with other computing devices, such as over a network. The radio 1072 is one example of communication media. The embodiment of the system 1002 is shown with two types of notification output devices: the LED 1080 that can be used to provide visual notifications and an audio interface 1074 that can be used with speaker 1030 to provide audio notifications. These devices may be directly coupled to the power supply 1070 so that when activated, they remain on for a duration dictated by the notification mechanism even though processor 1060 and other components might shut down for conserving battery power. The LED 1080 may be programmed to remain on indefinitely until the user takes action to indicate the powered-on status of the device. The audio interface 1074 is used to provide audible signals to and receive audible signals from the user. For example, in addition to being coupled to speaker 1030, the audio interface 1074 may also be coupled to a microphone (not shown) to receive audible input, such as to facilitate a telephone conversation. In accordance with embodiments, the microphone may also serve as an audio sensor to facilitate control of notifications. The system 1002 may further include a video interface 1076 that enables an operation of on-board camera 1040 to record still images, video streams, and the like.

A mobile computing device implementing the system 1002 may have additional features or functionality. For example, the device may also include additional data storage devices (removable and/or non-removable) such as, magnetic disks, optical disks, or tape. Such additional storage is illustrated in FIG. 10B by storage 1068.

Data/information generated or captured by the mobile computing device 1050 and stored via the system 1002 may be stored locally on the mobile computing device 1050, as described above, or the data may be stored on any number of storage media that may be accessed by the device via the radio 1072 or via a wired connection between the mobile computing device 1050 and a separate computing device associated with the mobile computing device 1050, for example, a server computer in a distributed computing network such as the Internet. As should be appreciated such data/information may be accessed via the mobile computing device 1050 via the radio 1072 or via a distributed computing network. Similarly, such data/information may be readily transferred between computing devices for storage and use according to well-known data/information transfer and storage means, including electronic mail and collaborative data/information sharing systems.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routines' operations may be modified in any manner, including by reordering operations and/or inserting or operations, without departing from the embodiments described herein.

It will be apparent to those skilled in the art that various modifications or variations may be made without departing from the scope or spirit of the embodiments described herein. Other embodiments will be apparent to those skilled in the art from consideration of the specification and practice of the embodiments described herein.

What is claimed is:

1. A method for operating a device for providing a linked entity, comprising:
receiving, via a user interface, a first user input comprising an invocation character and a first character arranged after the invocation character, the invocation character comprising a non-space character;
in response to receiving the first user input, identifying a plurality of first identification entities relevant to the first character, each first identification entity associated with a different user;
displaying, via a display, a first auto-complete suggestion list comprising the plurality of first identification entities;
receiving, via the user interface, a second user input selecting one of the plurality of first identification entities of the first auto-complete suggestion list, the selected first identification entity being associated with a first user;
creating a first linked entity linking the selected first identification entity to program code defining an action involving the first user;
displaying, via the display, the invocation character and first linked entity wherein the displayed first linked entity is arranged after the invocation character and editable only by deleting the first linked entity in its entirety;
receiving, via the user interface, a third user input selecting the displayed first linked entity;
in response to receiving the third user input, highlighting the displayed first linked entity in its entirety;
while the displayed first linked entity is being highlighted, receiving, via the user interface, a fourth user input comprising a second character; and
in response to receiving the fourth user input, performing:
deleting the first linked entity while maintaining the invocation character;
identifying a plurality of second identification entities relevant to the second character, each second identification entity associated with a different user; and
displaying, via the display, a second auto-complete suggestion list comprising the plurality of second identification entities.

2. The method of claim 1, further comprising:
receiving, via the user interface, a fifth user input selecting one of the plurality of second identification entities of the second auto-complete suggestion list, the selected second identification being associated with a second user;
creating a second linked entity linking the selected second identification entity to the program code defining an action involving the second user; and
displaying, via the display, the second linked entity, wherein the displayed second linked entity is arranged after the invocation character and editable only by deleting the second linked entity in its entirety.

3. The method of claim 1, wherein the first character comprises a text character or a graphic character.

4. The method of claim 1, wherein the user interface is rendered for a messaging application.

5. The method of claim 1, further comprising dynamically filtering the first auto-complete suggestion list as more characters are being received for the first user input.

6. The method of claim 1, wherein the action defined by the program code comprises initiating a message post to the first user.

7. A data processing system for providing a linked entity, comprising:
a processor; and
a memory in communication with the processor, the memory comprising executable instructions that, when executed by the processor, cause the processor to control the data processing system to perform functions of:

receiving, via a user interface, a first user input comprising an invocation character and a first character arranged after the invocation character, the first invocation character comprising a non-space character;

in response to receiving the first user input, identifying a plurality of first identification entities relevant to the first character, each first identification entity associated with a different user;

displaying, via a display, a first auto-complete suggestion list comprising the plurality of first identification entities;

receiving, via the user interface, a second user input to select one of the plurality of first identification entities of the first auto-complete suggestion list, the selected first identification entity being associated with a first user;

creating a first linked entity linking the selected first identification entity to program code defining an action involving the first user;

displaying, via the display, the invocation character and first linked entity, wherein the displayed first linked entity is arranged after the invocation character and editable only by deleting the first linked entity in its entirety;

receiving, via the user interface, a third user input selecting the displayed first linked entity;

in response to receiving the third user input, highlighting the displayed first linked entity in its entirety;

while the displayed first linked entity is being highlighted, receiving, via the user interface, a fourth user input comprising a second character; and in response to receiving the fourth user input, performing:
  deleting the first linked entity while maintaining the invocation character;
  identifying a plurality of second identification entities relevant to the second character, each second identification entity associated with a different user; and
  displaying, via the display, a second auto-complete suggestion list comprising the plurality of second identification entities.

8. The data processing system of claim 7, wherein the instructions, when executed by the processor, further cause the processor to control the data processing system to perform functions of:

receiving, via the user interface, a fifth user input selecting one of the plurality of second identification entities of the second auto-complete suggestion list, the selected second identification being associated with a second user;

creating a second linked entity linking the selected second identification entity to the program code defining an action involving the second user; and displaying, via the display, the second linked entity, wherein the displayed second linked entity is arranged after the invocation character and editable only by deleting the second linked entity in its entirety.

9. The data processing system of claim 7, wherein the first character comprises a text character or a graphic character.

10. The data processing system of claim 7, wherein the user interface is rendered for a messaging application.

11. The data processing system of claim 7, wherein the instructions, when executed by the processor, further cause the processor to control the data processing system to perform a function of dynamically filtering the first auto-complete suggestion list as more characters are being received for the first user input.

12. The data processing system of claim 7, wherein the action defined by the program code comprises initiating a message post to the first user.

13. A non-transitory computer readable medium containing instructions which, when executed by a processor, cause a data processing system to perform functions of:

receiving, via a user interface, a first user input comprising an invocation character and a first character arranged after the invocation character, the first invocation character comprising a non-space character;

in response to receiving the first user input, identifying a plurality of first identification entities relevant to the first character, each first identification entity associated with a different user;

displaying, via a display, a first auto-complete suggestion list comprising the plurality of first identification entities;

receiving, via the user interface, a second user input to select one of the plurality of first identification entities of the first auto-complete suggestion list, the selected first identification entity being associated with a first user;

creating a first linked entity linking the selected first identification entity to program code defining an action involving the first user;

displaying, via the display, the invocation character and first linked entity, wherein the displayed first linked entity is arranged after the invocation character and editable only by deleting the first linked entity in its entirety;

receiving, via the user interface, a third user input to select the displayed first linked entity;

in response to receiving the third user input, highlighting the displayed first linked entity in its entirety;

while the displayed first linked entity is being highlighted, receiving, via the user interface, a fourth user input comprising a second character; and in response to receiving the fourth user input, performing:
  deleting the first linked entity while maintaining the invocation character;
  identifying a plurality of second identification entities relevant to the second character, each second identification entity associated with a different user; and
  displaying, via the display, a second auto-complete suggestion list comprising the plurality of second identification entities.

14. The non-transitory computer readable medium of claim 13, wherein the first character comprises a text character or a graphic character.

15. The non-transitory computer readable medium of claim 13, wherein the action defined by the program code comprises initiating a message post to the first user.

16. The non-transitory computer readable medium of claim 13, wherein the instructions, when executed by the processor, further cause the processor to control the data processing system to perform functions of:

receiving, via the user interface, a fifth user input selecting one of the plurality of second identification entities of the second auto-complete suggestion list, the selected second identification being associated with a second user;

creating a second linked entity linking the selected second identification entity to the program code defining an action involving the second user; and displaying, via the display, the second linked entity, wherein the displayed second linked entity is arranged after the invocation character and editable only by deleting the second linked entity in its entirety.

17. The non-transitory computer readable medium of claim 13, wherein the user interface is rendered for a messaging application.

18. The non-transitory computer readable medium of claim 13, wherein the instructions, when executed by the processor, further cause the processor to control the data processing system to perform a function of dynamically filtering the first auto-complete suggestion list as more characters are being received for the first user input.

* * * * *